United States Patent
Berner et al.

(10) Patent No.: US 11,437,630 B2
(45) Date of Patent: Sep. 6, 2022

(54) FUEL CELL (71) Applicant: Robert Bosch GmbH, Stuttgart (DE)

(72) Inventors: Ulrich Berner, Stuttgart (DE); Jan Hendrik Ohs, Renningen (DE); Stefan Schoenbauer, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 259 days.

(21) Appl. No.: 16/625,751

(22) PCT Filed: May 8, 2018

(86) PCT No.: PCT/EP2018/061809
§ 371 (c)(1),
(2) Date: Dec. 22, 2019

(87) PCT Pub. No.: WO2018/233921
PCT Pub. Date: Dec. 27, 2018

(65) Prior Publication Data
US 2021/0159516 A1 May 27, 2021

(30) Foreign Application Priority Data
Jun. 23, 2017 (DE) .................... 10 2017 210 664.6

(51) Int. Cl.
| H01M 8/0254 | (2016.01) |
| H01M 8/0245 | (2016.01) |
| H01M 8/0258 | (2016.01) |
| H01M 8/1004 | (2016.01) |
| D03D 1/00 | (2006.01) |
| D03D 3/08 | (2006.01) |

(52) U.S. Cl.
CPC ........ H01M 8/0254 (2013.01); D03D 1/0088 (2013.01); D03D 3/08 (2013.01); H01M 8/0245 (2013.01); H01M 8/0258 (2013.01); H01M 8/1004 (2013.01); *D10B 2401/16* (2013.01)

(58) Field of Classification Search
CPC ............. H01M 8/0254; H01M 8/0245; H01M 8/0258; H01M 8/1004; H01M 8/0234; H01M 8/0239; H01M 8/0241; H01M 8/0232; D03D 1/0088; D03D 3/08; D10B 2401/16; Y02E 60/50
See application file for complete search history.

(56) References Cited

U.S. PATENT DOCUMENTS

| 2010/0009233 A1* | 1/2010 | Blanchet | ............. | H01M 8/0206 |
| | | | | 429/415 |
| 2010/0129731 A1* | 5/2010 | Warner | ............... | H01M 8/0236 |
| | | | | 429/507 |
| 2014/0147762 A1 | 5/2014 | Maass et al. | | |
| 2015/0079495 A1* | 3/2015 | Iritsuki | ................. | H01M 8/026 |
| | | | | 429/481 |

FOREIGN PATENT DOCUMENTS

| DE | 19517443 | 11/1996 |
| DE | 102012221730 | 5/2014 |
| DE | 102014207594 | 10/2015 |
| EP | 1501144 | 1/2005 |
| EP | 2294646 | 3/2011 |
| EP | 2835852 | 2/2015 |
| JP | 2007524956 A | 8/2007 |
| JP | 2011048936 A | 3/2011 |
| JP | 2013191505 A | 9/2013 |
| WO | 2008082387 | 7/2008 |
| WO | 2010061703 A1 | 6/2010 |

OTHER PUBLICATIONS

International Search Report for Application No. PCT/EP2018/061809 dated Jul. 19, 2018 (English Translation, 3 pages).

* cited by examiner

*Primary Examiner* — Muhammad S Siddiquee
(74) *Attorney, Agent, or Firm* — Michael Best & Friedrich LLP (57) ABSTRACT

The invention relates to a fuel cell (2) comprising at least one membrane/electrode unit (10) comprising a first electrode (21) and a second electrode (22), which electrodes are separated from one another by a membrane (18), and comprising at least one bipolar plate (40) which comprises a first distribution region (50) for distributing a fuel to the first electrode (21) and a second distribution region (60) for distributing an oxidation agent to the second electrode (22). A distribution unit (30) is provided in at least one of the distribution regions (50, 60) and has at least one flat woven fabric (80), wherein the flat woven fabric (80) is deformed in such a way that raised portions (32) of the woven fabric (80) touch one of the electrodes (21, 22).

8 Claims, 9 Drawing Sheets

FUEL CELL

BACKGROUND OF THE INVENTION

The invention relates to a fuel cell which comprises at least one membrane-electrode assembly having a first electrode and a second electrode which are separated from one another by a membrane, and at least one bipolar plate. The bipolar plate of the fuel cell comprises a first distribution region for distributing a fuel to the first electrode and a second distribution region for distributing an oxidant to the second electrode.

A fuel cell is an electrochemical cell which converts the chemical reaction energy of a continuously supplied fuel and an oxidant into electric energy. A fuel cell is thus an electrochemical energy converter. In known fuel cells, hydrogen (H2) and oxygen (O2), in particular, are converted into water (H2O), electric energy and heat.

An electrolyzer is an electrochemical energy converter which splits water (H2O) into hydrogen (H2) and oxygen (O2) by means of electric energy.

Proton-exchange membrane (PEM) fuel cells are known, inter alia. Anion-exchange membranes both for fuel cells and also for electrolyzers are also known. Proton-exchange membrane fuel cells have a centrally arranged membrane which is permeable to protons, i.e. hydrogen ions. The oxidant, in particular atmospheric oxygen, is spatially separated from the fuel, in particular hydrogen, thereby.

Proton-exchange membrane fuel cells also have an anode and a cathode. The fuel is supplied at the anode of the fuel cell and is catalytically oxidized to protons with release of electrons. The protons go through the membrane to the cathode. The electrons which have been released are conducted out from the fuel cell and flow through an external current circuit to the cathode.

The oxidant is supplied at the cathode of the fuel cell and reacts by uptake of electrons from the external current circuit and protons which have traveled through the membrane to the cathode to form water. The water formed in this way is discharged from the fuel cell. The overall reaction is:

$$O_2 + 4H^+ + 4e^- \rightarrow 2H_2O$$

An electric potential is present between the anode and the cathode of the fuel cell. To increase the electric potential, it is possible for a plurality of fuel cells to be arranged mechanically after one another to form a fuel cell stack and electrically connected in series.

To bring about uniform distribution of the fuel at the anode and to bring about uniform distribution of the oxidant at the cathode, bipolar plates are provided. The bipolar plates have, for example, channel-like structures for distributing the fuel and the oxidant at the electrodes. The channel-like structures also serve to conduct away the water formed in the reaction. The bipolar plates can also have structures for passing a cooling liquid through the fuel cell in order to remove heat.

A fuel cell having a bipolar plate of the type in question, which is made up of two plate halves, is known from DE 10 2012 221 730 A1. Here, each of the two plate halves has a distribution region which is provided for distributing the reaction gases.

A bipolar plate for a fuel cell is also known from DE 10 2014 207 594 A1. Here, the bipolar plate has a meandering channel which is, for example, configured as a groove. This meandering channel serves to introduce hydrogen or oxygen into the fuel cell.

SUMMARY OF THE INVENTION

A fuel cell which comprises at least one membrane-electrode assembly having a first electrode and a second electrode which are separated from one another by a membrane, and at least one bipolar plate, is proposed. In particular, the fuel cell has such a structure that a bipolar plate adjoins the membrane-electrode assembly on each side. The bipolar plate of the fuel cell comprises a first distribution region for distributing a fuel to the first electrode and a second distribution region for distributing an oxidant to the second electrode.

According to the invention, a distribution unit which comprises at least one flat woven fabric is provided in at least one of the distribution regions. The flat woven fabric is deformed in such a way that raised regions of the woven fabric touch one of the electrodes. Such a deformation of the woven fabric makes it possible to form, in a targeted manner, structures for distributing the reaction gases in the distribution region.

The woven fabric is preferably provided in the second distribution region which serves to distribute the oxidant to the second electrode and to conduct away water formed in the reaction. However, the woven fabric can, as an alternative or in addition, be provided in the first distribution region for distributing a fuel to the first electrode. The woven fabric can also, as an alternative or in addition, be provided in a third distribution region for passage of a coolant.

For the purposes of the present invention, a woven fabric is a structure which is formed by interwoven wires, threads or fibers. The woven fabric has a comparatively flat configuration. Before the deformation according to the invention, the woven fabric extends over an area which defines a woven fabric plane significantly further than in a direction perpendicular to this woven fabric plane.

The woven fabric is advantageously porous and electrically conductive. The woven fabric is thus permeable to the oxidant and to the fuel and also to water to be discharged. Furthermore, the woven fabric provides an electrically conductive connection to the electrode. The woven fabric can thus conduct the electrons liberated in the electrochemical reaction in the fuel cell.

In an advantageous embodiment of the invention, the flat woven fabric of the distribution unit has a corrugation-like deformation, with the raised regions of the woven fabric being configured as corrugation peaks. The corrugation peaks run, for example, in a straight line. However, the corrugation peaks can also have different shapes.

In one possible embodiment of the invention, the raised regions of the woven fabric extend at right angles to a flow direction of the fuel or of the oxidant in the corresponding distribution region of the bipolar plate.

In another possible embodiment of the invention, the raised regions of the woven fabric extend parallel to a flow direction of the fuel or of the oxidant in the corresponding distribution region of the bipolar plate.

In a further possible embodiment of the invention, the raised regions of the woven fabric extend inclined at an angle to a flow direction of the fuel cell or of the oxidant in the corresponding distribution region of the bipolar plate.

In a further advantageous embodiment of the invention, the flat woven fabric has local elevations which form the raised regions of the woven fabric. The woven fabric thus extends predominantly in a woven fabric plane, with the raised regions formed by the local elevations projecting away from the woven fabric plane, in particular at right angles.

In one possible embodiment of the invention, the raised regions of the woven fabric formed by the local elevations have the shape of a frustum of a cone or the shape of a hemisphere. However, other shapes of the local elevations are conceivable.

The woven fabric of the distribution unit advantageously has at least one metal-containing fiber. The metal-containing fiber ensures, in particular, electrical conductivity of the woven fabric. Suitable possible materials for the metal-containing fiber are, for example, titanium, copper, aluminum, nickel or stainless steel.

The woven fabric of the distribution unit advantageously has at least one carbon-containing fiber. The carbon-containing fiber is particularly corrosion-resistant and in addition increases the required mechanical stability of the woven fabric.

The woven fabric of the distribution unit advantageously has at least one polymer-containing fiber. The polymer-container fiber is comparatively light in comparison with fibers composed of other materials and thus reduces the weight of the woven fabric. In addition, polymer-containing fibers are inexpensive and corrosion-resistant.

In an advantageous further development of the invention, the woven fabric has at least two different types of fibers.

In a further embodiment of the invention, the distribution unit comprises at least two woven fabrics which are stacked on top of one another. The raised regions of the at least two woven fabrics are offset relative to one another. The at least two woven fabrics stacked on top of one another can be arranged in different orientations. The at least two woven fabrics stacked on top of one another can have a similar structure and configuration. However, the at least two woven fabrics stacked on top of one another can be configured differently. For example, the at least two woven fabrics stacked on top of one another can be made of different materials or have different porosities.

Woven fabrics are extremely open-pored, and thus have a high porosity. The woven fabric can be matched to the prevailing conditions and requirements by appropriate variation of the materials used in the production of the woven fabric. In addition, woven fabrics are very simple and inexpensive to produce, especially compared to foams. When a gas, in particular the fuel or the oxidant, flows through the woven fabric, only a comparatively small pressure drop in the gas flow arises. In addition, the electrical conductivity of the woven fabric is comparatively high when appropriate metallic fibers are used. Different materials having desired specific properties can advantageously be combined with one another. For example, a combination of metallic fibers having good electrical conductivity with carbon-containing fibers which have a better corrosion resistance is conceivable. The electrical resistance of the distributed unit can be increased by stacking of a plurality of thin-wired woven fabrics, but use of different materials is also possible.

BRIEF DESCRIPTION OF THE DRAWINGS

Embodiments of the invention will be explained in more detail with the aid of the drawings and the subsequent description.

The figures show:

FIG. 1 a schematic depiction of a fuel cell stack having a plurality of fuel cells, FIG. 2 a perspective view of a distribution unit according to a first variant, FIG. 3 a perspective view of a distribution unit according to a second variant, FIG. 4 a perspective view of a distribution unit according to a third variant, FIG. 5 a perspective view of a distribution unit according to a fourth variant, FIG. 6 a section through the distribution unit of FIG. 2 according to a first embodiment, FIG. 7 a section through the distribution unit of FIG. 2 according to a second embodiment, FIG. 8 a section through the distribution unit of FIG. 2 according to a third embodiment, FIG. 9 a perspective view of a distribution unit according to a fifth variant, FIG. 10 a section through the distribution unit of FIG. 9, FIG. 11 a plan view of a distribution unit according to a sixth variant, FIG. 12 a section through the distribution unit of FIG. 11, FIG. 13 a further section through the distribution unit of FIG. 11, FIG. 14 a further section through the distribution unit of FIG. 11, FIG. 15 a bipolar plate of the fuel cell stack of FIG. 1 with the distribution unit of FIG. 2 and FIG. 16 a bipolar plate of the fuel cell stack of FIG. 1 with the distribution unit of FIG. 9.

DETAILED DESCRIPTION

In the following description of the embodiments of the invention, identical or similar elements are denoted by the same reference numerals, and a repeated description of these elements in individual cases will be dispensed with. The figures present the subject matter of the invention only schematically.

Figure 1:
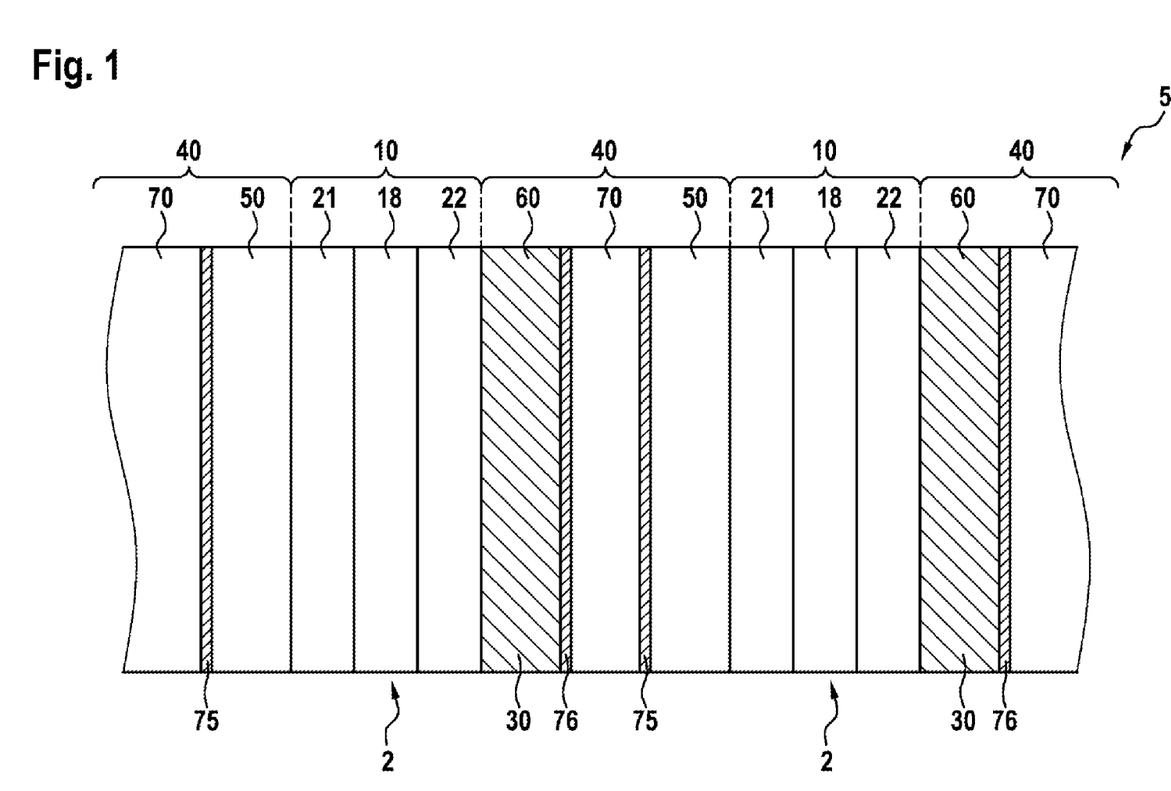

FIG. 1 shows a schematic depiction of a fuel cell stack 5 having a plurality of fuel cells 2. Each fuel cell 2 has a membrane-electrode assembly 10 which comprises a first electrode 21, a second electrode 22 and a membrane 18. The two electrodes 21, 22 are arranged on opposite sides of the membrane 18 and are thus separated from one another by the membrane 18. The first electrode 21 will hereinafter also be referred to as anode 21 and the second electrode 22 will hereinafter also be referred to as cathode 22. The membrane 18 is a polymer electrolyte membrane. The membrane 18 is permeable to hydrogen ions, i.e. $H^+$ ions.

Each fuel cell 2 also has two bipolar plates 40 which adjoin the membrane-electrode assembly 10 on both sides. In the arrangement of a plurality of fuel cells 2 in the fuel cell stack 5 as shown here, each of the bipolar plates 40 can be considered to belong to two fuel cells 2 arranged next to one another.

The bipolar plates 40 each comprise a first distribution region 50 for distributing a fuel, which first distribution region faces the anode 21. The bipolar plates 40 also each comprise a second distribution region 60 for distributing the oxidant, which second distribution region faces the cathode 22. The second distribution region 60 at the same time serves to discharge water formed in a reaction in the fuel cell 2. A distribution unit 30 is arranged in the second distribution region 60.

The bipolar plates 40 here comprise a third distribution region 70 which is arranged between the first distribution region 50 and the second distribution region 60. The third distribution region 70 serves to conduct a coolant through the bipolar plate 40 and thus cool the fuel cell 2 and the fuel cell stack 5.

The first distribution region 50 and the third distribution region 70 are separated from one another by a first separating plate 75. The second distribution region 60 and the third distribution region 70 are separated from one another by a second separating plate 76. The separating plates 75, 76 of the bipolar plates 40 are in the present case configured as thin metallic sheets. The separating plates 75, 76 can also be made of another material, for example carbon or graphite.

During operation of the fuel cell 2, fuel is fed via the first distribution region 50 to the anode 21. Likewise, oxidant is fed via the second distribution region 60 with the distribution unit 30 to the cathode 22. The fuel, in the present case hydrogen, is oxidized catalytically at the anode 21 with release of electrons to form protons. The protons go through the membrane 18 to the cathode 22. The electrons released are conducted out from the fuel cell 2 and flow via an external current circuit to the cathode 22. The oxidant, in the present case atmospheric oxygen, reacts by uptake of the electrons from the external current circuit and protons which have traveled through the membrane 18 to the cathode 22 to form water.

Figure 2:
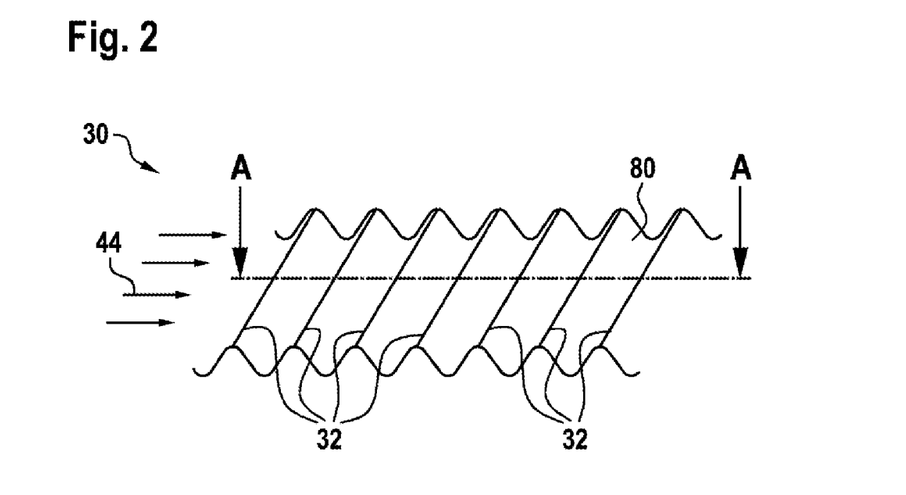

FIG. 2 shows a perspective view of a distribution unit 30 according to a first variant. The distribution unit 30 comprises a flat woven fabric 80. The flat woven fabric 80 has a corrugation-like deformation and has corrugation peaks which form raised regions 32 of the woven fabric 80. The raised regions 32 are in the form of straight lines and extend at right angles to a second flow direction 44 of the oxidant.

Figure 3:
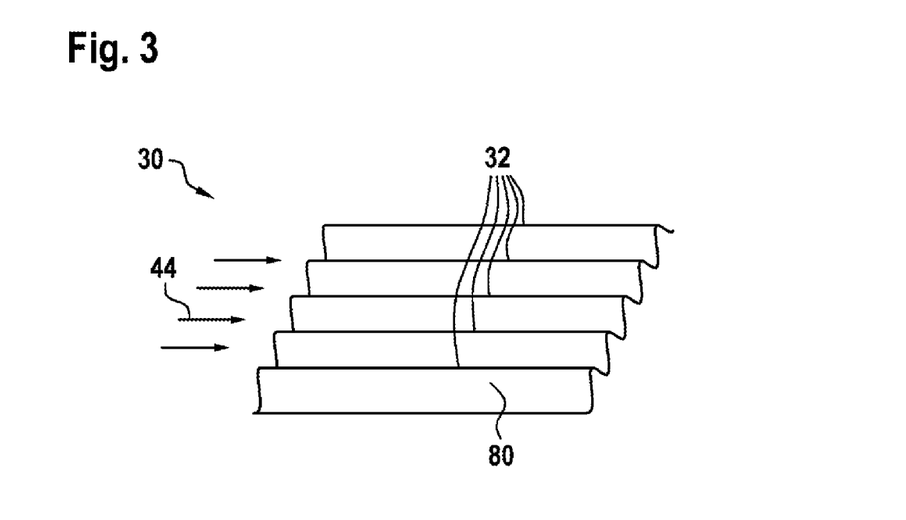

FIG. 3 shows a perspective view of a distribution unit 30 according to a second variant. The distribution unit 30 has a flat woven fabric 80. The flat woven fabric 80 has a corrugation-like deformation and has corrugation peaks which form raised regions 32 of the woven fabric 80. The raised regions 32 are configured as straight lines and extend parallel to the second flow direction 44 of the oxidant.

Figure 4:
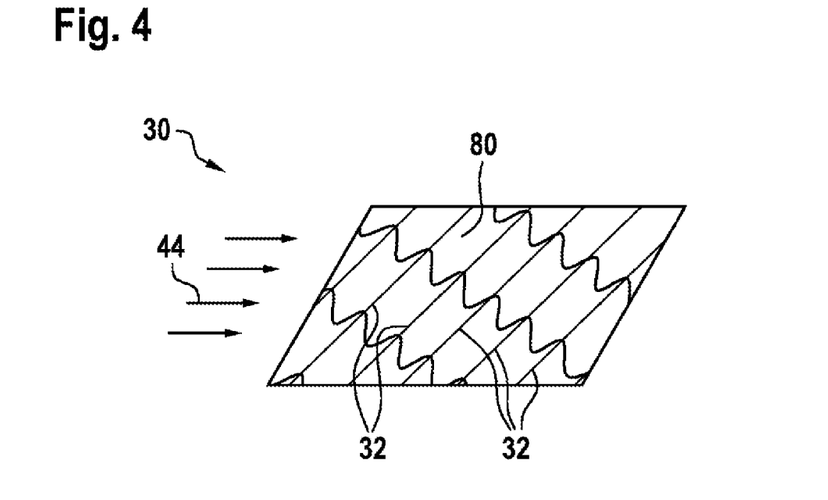

FIG. 4 shows a perspective view of a distribution unit 30 according to a third variant. The distribution unit 30 has a flat woven fabric 80. The flat woven fabric 80 has a corrugation-like deformation and has corrugation peaks which form raised regions 32 of the woven fabric 80. The raised regions 32 are configured as straight lines and extend at an angle to the second flow direction 44 of the oxidant.

Figure 5:
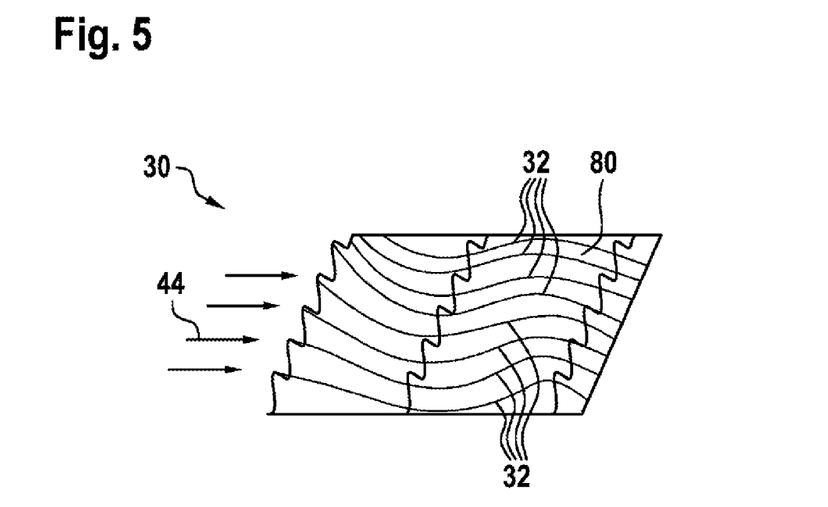

FIG. 5 shows a perspective view of a distribution unit 30 according to a fourth variant. The distribution unit 30 has a flat woven fabric 80. The flat woven fabric 80 has a corrugation-like deformation and has corrugation peaks which form raised regions 32 of the woven fabric 80. The raised regions 32 are in the present case not in the form of straight lines but in the form of wavy lines or as herringbone pattern or zig-zag lines. The raised regions 32 extend essentially parallel to the second flow direction 44 of the oxidant.

Figure 6:
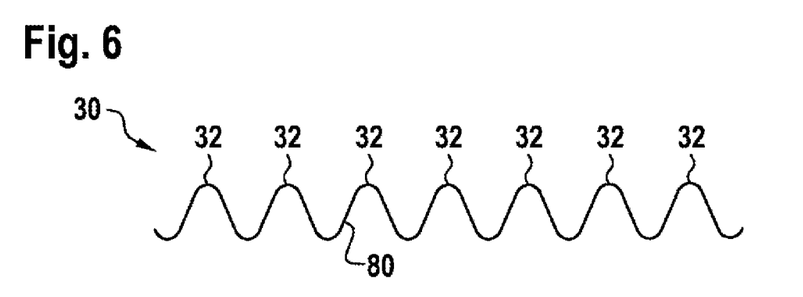

FIG. 6 shows a section along the line A-A through the distribution unit 30 of FIG. 2 according to a first embodiment. The woven fabric 80 of the distribution unit 30 has been deformed in the shape of a sine function. The raised regions 32 are local maxima of the sine function.

Figure 7:
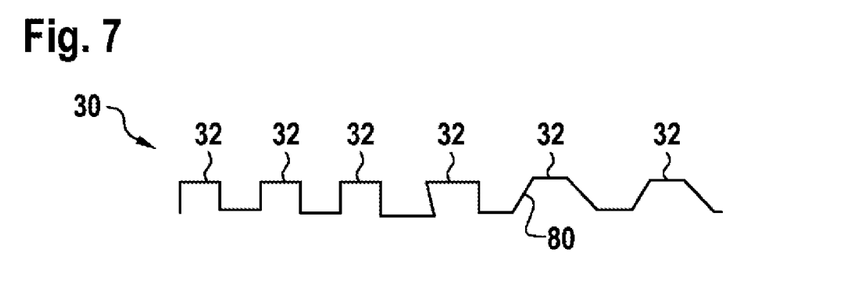

FIG. 7 shows a section along the line A-A through the distribution unit 30 of FIG. 2 according to a second embodiment. The woven fabric 80 of the distribution unit 30 has been deformed, inter alia, in the form of a rectangular function. The raised regions 32 are local maxima of the rectangular function. Contact points in the form of an area are advantageous here.

Figure 8:
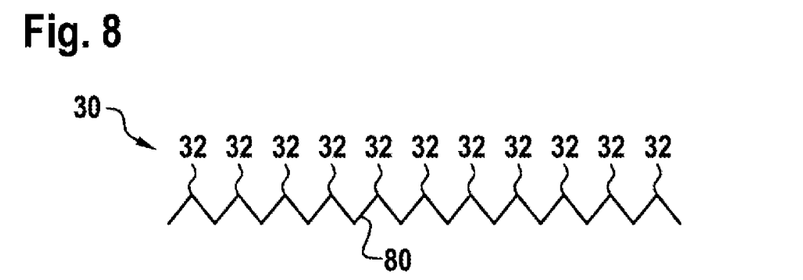

FIG. 8 shows a section along the line A-A through the distribution unit 30 of FIG. 2 according to a third embodiment. The woven fabric 80 of the distribution unit 30 has been deformed in the form of a triangular function or sawtooth function. The raised regions 32 are local maxima of the triangular function or sawtooth function.

The distribution unit 30 according to the second variant depicted in FIG. 3, the distribution unit 30 according to the third variant depicted in FIG. 4 and the distribution unit 30 according to the fourth variant depicted in FIG. 5 can likewise have woven fabrics 80 which are deformed as per the depictions in FIG. 6, FIG. 7 or FIG. 8.

Figure 9:
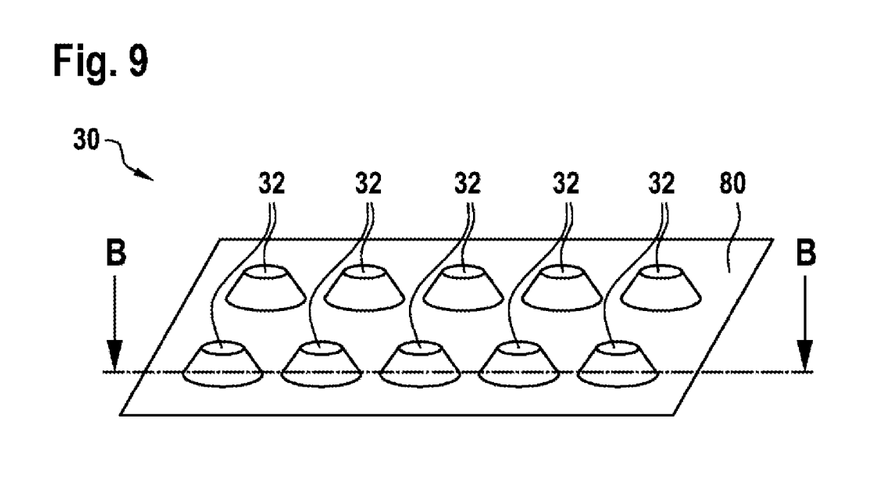

FIG. 9 shows a perspective view of a distribution unit 30 according to a fifth variant. The distribution unit 30 has a flat woven fabric 80. The woven fabric 80 has local elevations which form the raised regions 32 of the woven fabric 80. The raised regions 32 of the woven fabric 80 have, by way of example, the shape of a frustum of a cone in the present case.

Figure 10:
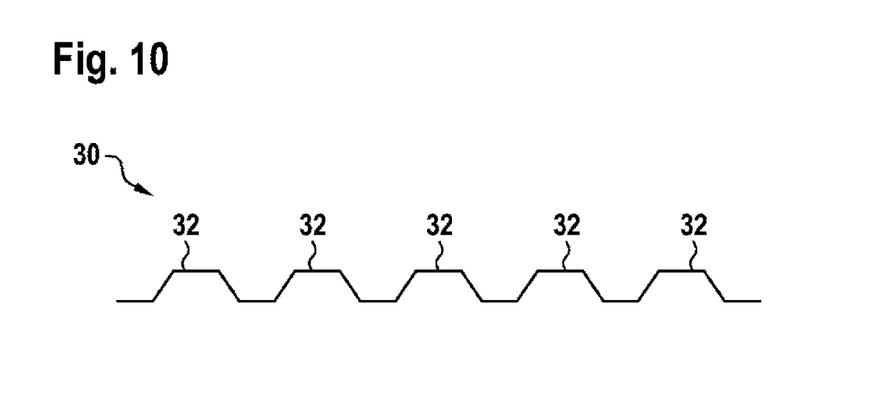

FIG. 10 shows a section along the line B-B through the distribution unit 30 of FIG. 9. The raised regions 32 having the shape of a frustum of a cone of the woven fabric 80 extend parallel to one another.

Figure 11:
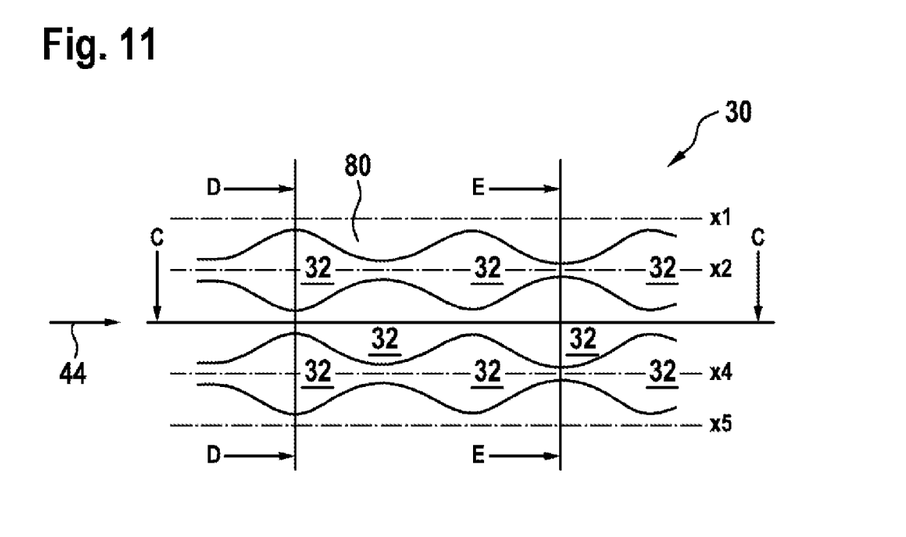

FIG. 11 shows a plan view of a distribution unit 30 according to a sixth variant. The distribution unit 30 has a flat woven fabric 80. The flat woven fabric 80 has local elevations which form the raised regions 32 of the woven fabric 80. The distribution unit 30 according to a sixth variant comprises a mixture of raised regions 32 and straight channels which preferably extend parallel to the second flow direction 44 of the oxidant. In the interests of clarity, auxiliary lines X1, X2, X4 and X5 are drawn in in addition to the section lines C, D and E in FIG. 11.

Figure 12:
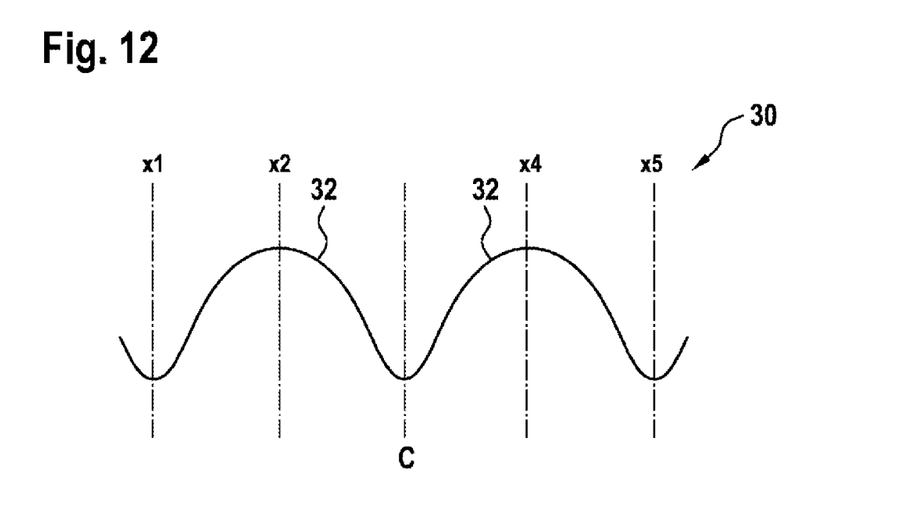
Figure 13:
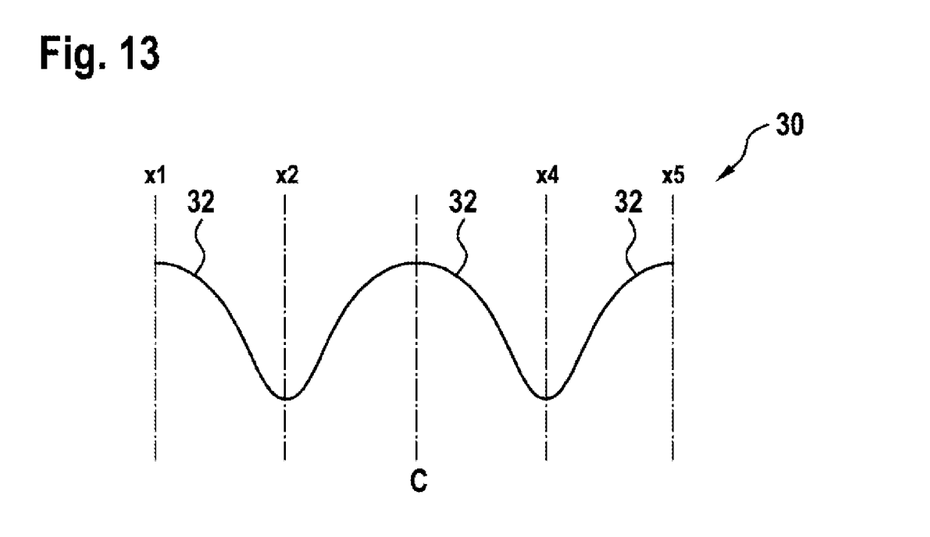
Figure 14:
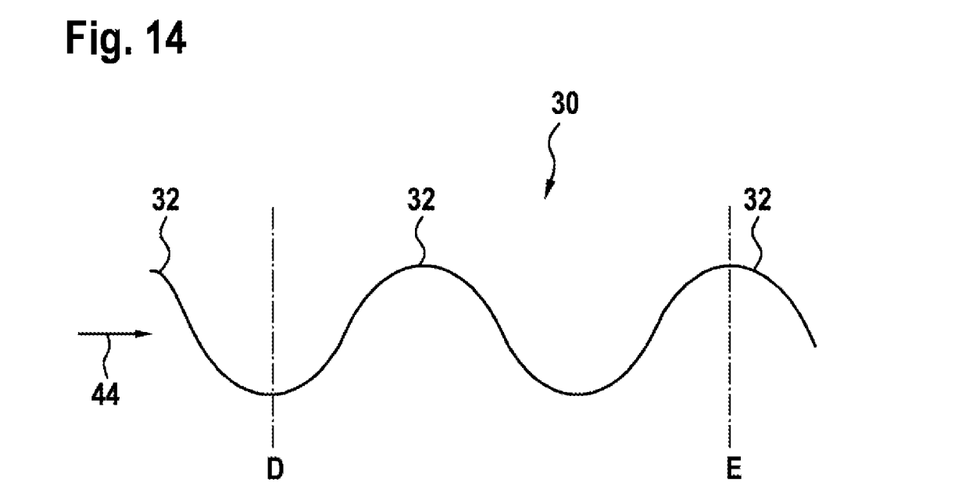

FIG. 12 shows a section along the line D-D through the distribution unit 30 of FIG. 11. FIG. 13 shows a section along the line E-E through the distribution unit 30 of FIG. 11. FIG. 14 shows a section along the line C-C through the distribution unit 30 of FIG. 11.

The woven fabric 80 of the distribution units 30 depicted in FIG. 2, FIG. 3, FIG. 4, FIG. 5, FIG. 9 and FIG. 11 has, for example, metal-containing fibers, carbon-containing fibers and polymer-containing fibers. The fibers are woven to form a sheet-like structure. The woven fabric 80 is thus porous and electrically conductive.

Figure 15:
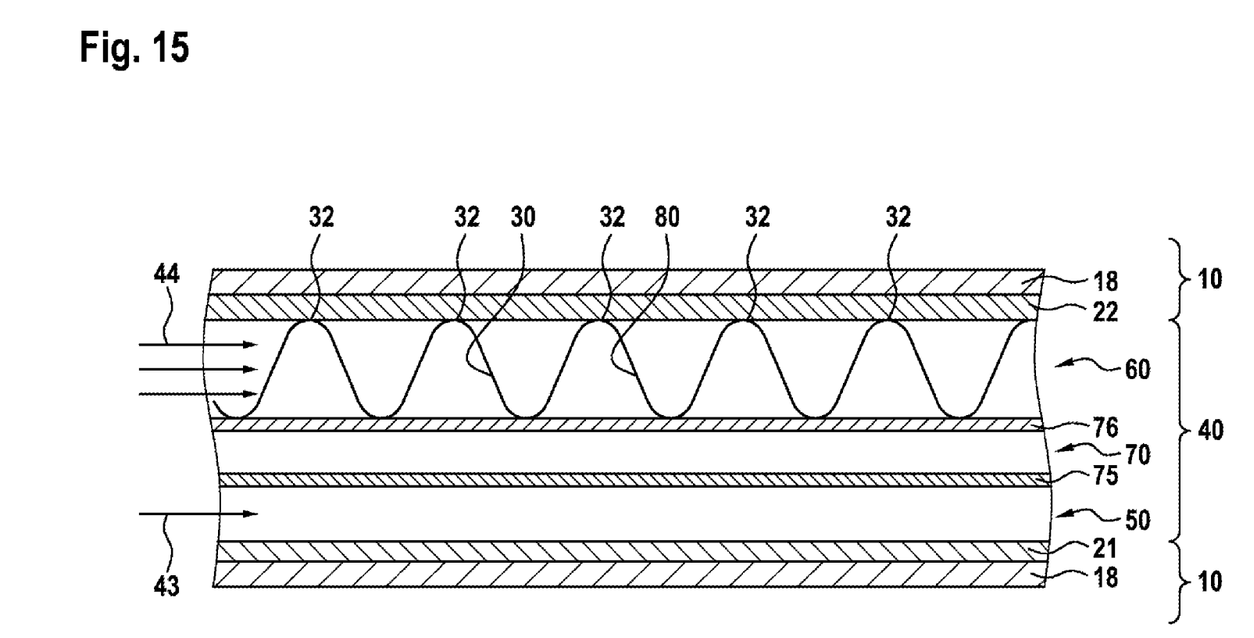

FIG. 15 shows an enlarged schematic depiction of a bipolar plate 40 of the fuel cell stack 5 of FIG. 1, which bipolar plate is arranged between two membrane-electrode assemblies 10. The separating plates 75, 76 are configured as flat thin metallic sheets and between each other form the third distribution region 70 for passage of the coolant. The first distribution region 50 is located between the first separating plate 75 and the anode 21 of the neighboring membrane-electrode assembly 10.

The second distribution region 60, which comprises a distribution unit 30 according to the first variant depicted in FIG. 2, is located between the second separating plate 76 and the cathode 22 of the other neighboring membrane-electrode assembly 10. The woven fabric 80 of the distribution unit 30 is arranged so that the raised regions 32 of the woven fabric 80 touch the cathode 22. Furthermore, the woven fabric 80 also touches the second separating plate 76.

Figure 16:
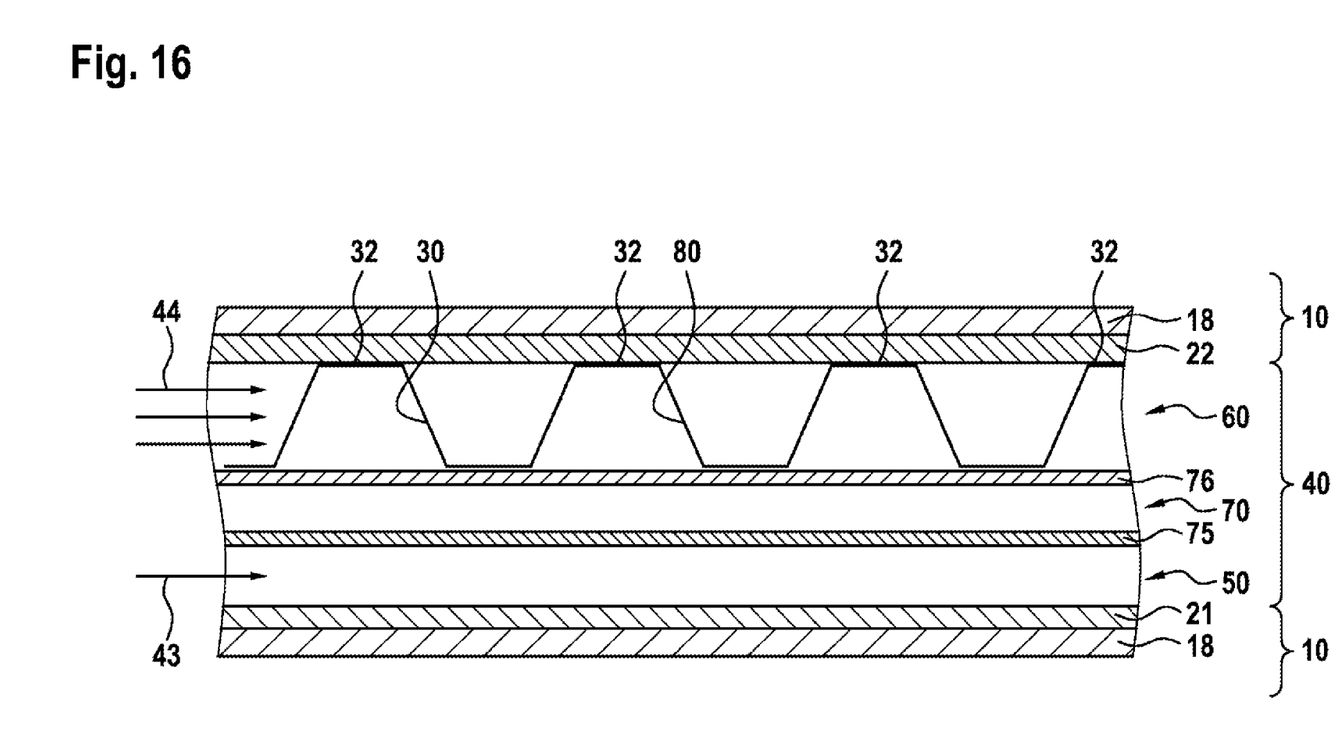

FIG. 16 shows an enlarged schematic depiction of a bipolar plate 40 of the fuel cell stack 5 of FIG. 1, which bipolar plate is arranged between two membrane-electrode assemblies 10. The separating plates 75, 76 are configured as flat thin metallic sheets and between each other form the third distribution region 70 for passage of the coolant. The first distribution region 50 is located between the first separating plate 75 and the anode 21 of the neighboring membrane-electrode assembly 10.

The second distribution region 60, which has a distribution unit 30 according to the fifth variant depicted in FIG. 9, is located between the second separating plate 76 and the cathode 22 of the other neighboring membrane-electrode assembly 10. The woven fabric 80 of the distribution unit 30 is arranged so that the raised regions 32 of the woven fabric 80 touch the cathode 22. Furthermore, the woven fabric 80 also touches the second separating plate 76.

In the bipolar plates 40 depicted in FIG. 15 and FIG. 16, the fuel, in the present case hydrogen, is fed in a first flow direction 43 into the first distribution region 50. The oxidant, in the present case atmospheric oxygen, is fed in the second flow direction 44 into the second distribution region 60. In the present case, the first flow direction 43 and the second flow direction 44 run parallel to one another. It is also conceivable for the first flow direction 43 and the second flow direction 44 to run in opposite directions or else orthogonally to one another.

The invention is not restricted to the working examples described here and the aspects emphasized therein. Rather, many modifications, which are of the kind that a person skilled in the art would make as a matter of routine, are possible within the range indicated by the claims.

The invention claimed is:

1. A fuel cell (2) comprising
   at least one membrane-electrode assembly (10) having a first electrode (21) and a second electrode (22) which are separated from one another by a membrane (18),
   at least one bipolar plate (40) which comprises
      a first distribution region (50) for distributing a fuel to the first electrode (21) and
      a second distribution region (60) for distributing an oxidant to the second electrode (22), and
   a distribution unit (30) in at least one of the distribution regions (50, 60), wherein the distribution unit comprises at least one flat woven fabric (80), wherein the flat woven fabric (80) has been deformed in such a way that raised regions (32) of the woven fabric (80) touch one of the electrodes (21, 22), wherein the flat woven fabric (80) has a corrugation-like deformation, wherein the raised regions (32) of the woven fabric (80) are configured as corrugation peaks, and wherein the raised regions (32) of the woven fabric (80) extend at right angles to a flow direction (43, 44) of the fuel or of the oxidant.

2. The fuel cell (2) as claimed in claim 1, characterized in that the woven fabric (80) is porous and electrically conductive.

3. The fuel cell (2) as claimed in claim 1, characterized in that the woven fabric (80) has at least two different types of fibers.

4. The fuel cell (2) as claimed in claim 1, characterized in that the distribution unit (30) comprises at least two woven fabrics (80) which are stacked on top of one another, with the raised regions (32) of the at least two woven fabrics (80) being offset relative to one another.

5. A fuel cell (2) comprising
   at least one membrane-electrode assembly (10) having a first electrode (21) and a second electrode (22) which are separated from one another by a membrane (18),
   at least one bipolar plate (40) which comprises
      a first distribution region (50) for distributing a fuel to the first electrode (21) and
      a second distribution region (60) for distributing an oxidant to the second electrode (22), and
   a distribution unit (30) in at least one of the distribution regions (50, 60), wherein the distribution unit comprises at least one flat woven fabric (80), wherein the flat woven fabric (80) has been deformed in such a way that raised regions (32) of the woven fabric (80) touch one of the electrodes (21, 22), wherein the flat woven fabric (80) has a corrugation-like deformation, wherein the raised regions (32) of the woven fabric (80) are configured as corrugation peaks, and wherein the raised regions (32) of the woven fabric (80) extend at an inclination to a flow direction (43, 44) of the fuel or of the oxidant.

6. The fuel cell (2) as claimed in claim 5, characterized in that the woven fabric (80) is porous and electrically conductive.

7. The fuel cell (2) as claimed in claim 5, characterized in that the woven fabric (80) has at least two different types of fibers.

8. The fuel cell (2) as claimed in claim 5, characterized in that the distribution unit (30) comprises at least two woven fabrics (80) which are stacked on top of one another, with the raised regions (32) of the at least two woven fabrics (80) being offset relative to one another.

* * * * *